(12) United States Patent
Spapis et al.

(10) Patent No.: US 10,798,019 B2
(45) Date of Patent: Oct. 6, 2020

(54) CONTEXT INFORMATION PROCESSOR, PROFILE DISTRIBUTION UNIT AND METHOD FOR A COMMUNICATION NETWORK

(71) Applicant: Huawei Technologies Co., Ltd., Shenzhen (CN)

(72) Inventors: Panagiotis Spapis, Munich (DE); Alexandros Kaloxylos, Munich (DE); Chan Zhou, Munich (DE); Athanasia Alonistioti, Athens (GR); Sokratis Barmpounakis, Athens (GR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/212,298

(22) Filed: Dec. 6, 2018

(65) Prior Publication Data

US 2019/0116130 A1   Apr. 18, 2019

Related U.S. Application Data

(63) Continuation of application No. PCT/EP2016/063081, filed on Jun. 8, 2016.

(51) Int. Cl.
*H04L 12/927* (2013.01)
*H04L 29/08* (2006.01)
*H04W 8/18* (2009.01)
*H04L 12/24* (2006.01)
*H04W 28/02* (2009.01)

(52) U.S. Cl.
CPC ........ *H04L 47/808* (2013.01); *H04L 41/5022* (2013.01); *H04L 67/22* (2013.01); *H04L 67/303* (2013.01); *H04L 67/306* (2013.01); *H04W 8/18* (2013.01); *H04W 28/0215* (2013.01); *H04W 28/0236* (2013.01)

(58) Field of Classification Search
CPC ............ H04W 16/18; H04W 28/0215; H04W 28/0236; H04W 8/18; H04L 41/5022; H04L 47/808; H04L 67/22; H04L 67/303; H04L 67/306
See application file for complete search history.

(56) References Cited

U.S. PATENT DOCUMENTS 6,839,339 B1   1/2005   Chuah
6,950,445 B2   9/2005   Svanbro et al.
(Continued)

FOREIGN PATENT DOCUMENTS

CN   102340826 A   2/2012

OTHER PUBLICATIONS

Cisco, "Cisco Visual Networking Index: Forecast and Methodology," 2014-2019, May 27, 2015, 14 pages.
(Continued)

*Primary Examiner* — Mewale A Ambaye
(74) *Attorney, Agent, or Firm* — Slater Matsil, LLP

(57) ABSTRACT

A context information processor for a communication network, comprising a determination unit configured to determine a context information of a user, an evaluation unit configured to evaluate whether the context information of the user complies with an active behavior profile of the user, and a transmitter configured to transmit the context information if the context information does not comply with the active behavior profile.

19 Claims, 10 Drawing Sheets

(56) References Cited

U.S. PATENT DOCUMENTS

| | | | |
|---|---|---|---|
| 8,539,040 B2 | 9/2013 | Luna et al. | |
| 9,215,244 B2 | 12/2015 | Ayyagari et al. | |
| 9,942,937 B1* | 4/2018 | Siedelhofer | H04W 12/06 |
| 2005/0168360 A1* | 8/2005 | Chen | H03H 17/028 |
| | | | 341/61 |
| 2007/0113249 A1 | 5/2007 | Kim et al. | |
| 2009/0287750 A1 | 11/2009 | Banavar et al. | |
| 2012/0296919 A1* | 11/2012 | Sinha | H04L 67/327 |
| | | | 707/749 |
| 2013/0012220 A1* | 1/2013 | Waris | H04W 4/38 |
| | | | 455/450 |
| 2013/0305357 A1 | 11/2013 | Ayyagari et al. | |
| 2015/0209839 A1* | 7/2015 | Brown | B25J 21/00 |
| | | | 134/18 |
| 2015/0341812 A1* | 11/2015 | Dion | H04W 24/08 |
| | | | 370/252 |
| 2016/0337844 A1* | 11/2016 | Hailpern | H04W 8/183 |
| 2017/0339554 A1* | 11/2017 | Chen | H04W 72/005 |
| 2019/0098490 A1* | 3/2019 | Jin | H04L 63/0876 |

OTHER PUBLICATIONS

Ericsson, "On the Pulse of the Networked Society," Ericsson Mobility Report, Nov. 2014, 32 pages.
NGMN Alliance, "NGMN 5G White Paper," Feb. 17, 2015, Version 1.0, 125 pages.
Makris, P. et al., "A Survey on Context-Aware Mobile and Wireless Networking: On Networking and Computing Environments' Integration," IEEE Communications Surveys and Tutorials, Apr. 11, 2012, pp. 362-386, vol. 15, No. 1.

* cited by examiner

| IMSI A | Mobility A | Service A | TimePeriod A | Day A |
|--------|------------|-----------|--------------|-------|
| IMSI A | Mobility A | Service B | TimePeriod B | Day A |

FIG. 9A

| IMSI A | Mobility A | Service A | TS1 |
|--------|------------|-----------|-----|
| IMSI A | Mobility A | Service A | TS2 |
| IMSI A | No Activity | | TS3 |
| IMSI A | Mobility B | Service A | TS4 |
| IMSI A | Mobility B | Service A | TS5 |
| IMSI A | Mobility A | Service A | TS6 |
| IMSI A | Mobility A | Service A | TS7 |
| IMSI A | No Activity | | TS8 |
| IMSI A | Mobility A | Service B | TS9 |
| IMSI A | Mobility B | Service B | TS10 |
| IMSI A | Mobility B | Service B | TS11 |
| IMSI A | Mobility A | Service A | TS12 |

Redundant information that can be discarded

No activity – no record

Deviation from the profile

Redundant information that can be discarded

FIG. 9B

| IMSI A | | | CI |
|--------|------------|-----------|------|
| | Mobility B | Service A | TS4 |
| | Mobility B | Service A | TS5 |
| | Mobility A | Service B | TS9 |
| | Mobility B | Service B | TS10 |
| | Mobility B | Service B | TS11 |

FIG. 9C

| Mobility A | Service A | Profile ID 1 |
|---|---|---|
| Mobility B | Service A | Profile ID 2 |
| Mobility C | Service A | Profile ID 3 |
| Mobility A | Service B | Profile ID 4 |
| Mobility B | Service B | Profile ID 5 |
| Mobility C | Service B | Profile ID 6 |
| Mobility A | Service C | Profile ID 7 |
| Mobility B | Service C | Profile ID 8 |

FIG. 9D

| IMSI A | | CI |
|---|---|---|
| Profile ID 2 | TS4 | |
| Profile ID 2 | TS5 | |
| Profile ID 4 | TS9 | |
| Profile ID 5 | TS10 | |
| Profile ID 5 | TS11 | |

FIG 9E

| IMSI A | CI |
|---|---|
| Profile ID 2 | Counter for Profile ID 2 |
| Profile ID 4 | Counter for Profile ID 4 |
| Profile ID 5 | Counter for Profile ID 5 |

FIG. 9F

CONTEXT INFORMATION PROCESSOR, PROFILE DISTRIBUTION UNIT AND METHOD FOR A COMMUNICATION NETWORK

CROSS-REFERENCE TO RELATED APPLICATIONS

This application is a continuation of International Application No. PCT/EP2016/063081, filed on Jun. 8, 2016, the disclosure of which is hereby incorporated by reference in its entirety.

TECHNICAL FIELD

The present application relates to a context information processor, a node, a user profile distribution unit and a method for transmitting context information of a user in a communication network. The present application also relates to a computer-readable storage medium storing program code, the program code comprising instructions for carrying out such a method.

BACKGROUND

The deployment of 5G cellular networks targets to support a vast number of devices, while at the same time existing 3GPP specifications keep on supporting legacy cellular access networks (e.g., GSM, HSPA, LTE, LTE-A) as well as alternative radio access technologies (e.g., WiFi). In this environment, end users have access to a diverse set of services (ranging from high definition video and audio, web browsing, games, to keep alive messages etc.) everywhere including indoor and outdoor environments with various mobilities (e.g., high speeds train, random indoor mobility, moving crowd, etc.).

In such demanding environment the use of context information is important for enabling an efficient use of the network resources. This typically involves transmitting context information to different nodes within the communication network. This can put a significant load on the network.

SUMMARY

In various embodiments, the present application provides a context information processor, a node, a user profile distribution unit for a communication network, and a method for transmitting context information of a user in a communication network, wherein the context information processor, the node and the user profile distribution unit overcome one or more of the problems of the prior art.

A first aspect of the application provides a context information processor for a communication network, comprising: a determination unit configured to determine a context information of a user, an evaluation unit configured to evaluate whether the context information of the user complies with an active behavior profile of the user, and a transmitter configured to transmit the context information if the context information does not comply with the active behavior profile.

In particular, the transmitter may be configured not to transmit the context information if the context information complies with the active behavior profile. In other words, the transmitter may be configured to transmit the context information only if the context information does not comply with the active behavior profile. Instead of transmitting the context information, in embodiments the transmitter may be configured to transmit an indication that a behavior complied with the active behavior profile. In particular, the transmitter may be configured to transmit an index and/or counter that indicates a degree of compliance with the active behavior profile.

A context information that is not transmitted may be discarded. Optionally, the transmitter can be configured to transmit an indication of an amount of context information that was discarded.

Context information refers to information that is used for executing control or management functions. This context information can be accessed and used in real time for enabling more targeted and sophisticated decision making. Context information is exchanged among the network entities, even heterogeneous ones so as to solve challenging networking problems such as management and control of the network resources. The context information may be used for the optimization of the network management and control including but not limited to radio measurements (e.g. one or more of RSS, RSRP, RSRQ), information related to the radio access network status (e.g. backhaul/fronthaul link capacity and usage, number of (un)successful calls/session establishments, handovers, PDCP and RLC counters), mobility information (e.g. user speed and/or number of handovers, number of location updates), power and/or energy information (e.g. battery consumption rate and/or battery level), charging information (e.g., call detail records, or collection of any chargeable information).

In some embodiments, the behavior profile can be implemented as a description of a certain user behavior with regard to mobility, accessed service, etc.

The active behavior profile is the predicted behavior of a user under certain preconditions. The active behavior profile can be a behavior profile that is selected from a group of behavior profiles or using other techniques (such as Bayesian networks, Marcov chains, etc.) based on certain preconditions e.g., a time and/or location of the user, battery level, charging status, etc. In other embodiments, if the user has only one behavior profile for a user then this is always considered to be the active behavior profile. Other behavior profiles that are not active can be referred to as inactive behavior profiles that are behavioral descriptions that the user is not supposed to have under the certain preconditions.

If the determined context information complies with the active behavior profile of the user, there is less need to transmit the context information. Hence, the context information processor of the first aspect can reduce a network load by not transmitting context information that complies with the active behavior profile.

The proposed implementation outperforms the state of the art solutions that are based on the direct communication among the networking elements, since it can remove redundancy in the collected context information. This enables context aware solutions to be scalable, since such solution may be employed in scenarios with large numbers of users. In such scenarios, if the proposed redundancy scheme is not employed the cost for the information communication will be significant.

UEs tend to have specific behaviors, in terms of properties including but not limited to specific accessed services, duration of accessed service, mobility, etc. These specific behaviors are related to characteristics but not limited to location, date, time, etc. For example, people tend to access the internet using their user equipments, or tend to have long calls, etc. which is beneficial for the operator if the latter has such knowledge, for managing his local network. From this point, when we refer to the preferences, habits, and/or behaviors of a specific user we use the term "behavior profile". The behavior profile enables the accurate prediction of the user behavior since it captures his preferences, habits, and/or behaviors under certain preconditions. Each user has at least one behavior profile, since his preferences, habits, and/or behaviors may alter according to changes in the context information. The context information includes but is not limited to inputs related to location, time, date, battery level, charging status, etc.

For extracting a behavior profile, processing of the available information in a logically centralized entity may be required. To this end, the context information processor may be located at a logically centralized location. Several mechanisms can be used for the processing of the available information coming from various fields (e.g. from data analytics, statistical analysis or probabilities).

In a first implementation of the context information processor according to the first aspect, the context information processor further comprises an aggregator configured to aggregate a plurality of context information of a user to obtain aggregated context information of the user, wherein the transmitter is configured to transmit the aggregated context information.

Aggregating the context information before transmission has the advantage that fewer messages with context information need to be transmitted. Also, a transmission size for the context information can be reduced if it is transmitted in aggregated form. For example, a transmission size requirement for transmitting to individual messages which each comprise one context information element may be much higher than one message which transmits the to context information element as one aggregated context information. A context information element is an example of a context information.

In a second implementation of the context information processor according to the first aspect as such or according to the first implementation of the first aspect, the aggregator is configured to aggregate the plurality of context information of the user with a unique identifier of the user, in particular an IMSI and/or a GUTI.

Aggregating with a unique identifier has the advantage that the unique identifier needs to be transmitted only once for a set of context information that are transmitted e.g. in one message.

In a third implementation of the context information processor according to the first aspect as such or according to any of the preceding implementations of the first aspect, the transmitter is configured to transmit the aggregated context information periodically and/or when a predetermined amount of context information has been aggregated.

This has the advantage that the context information processor can automatically transmit the context information such that the network is informed about relevant changes of context information, but an effort for transmission of the context information is still reduced.

In a fourth implementation of the context information processor according to the first aspect as such or according to any of the preceding implementations of the first aspect, the context information processor further comprises a consistency update unit configured to update a consistency index of a user if the context information complies with the active behavior profile.

This has the advantage that the consistency index can keep track of how well the behavior of the user corresponded to the active behavior profile. Updating the consistency index can for example comprise increasing a counter of the consistency index. The consistency index can be implemented as an array of integers, wherein each integer corresponds to a different behavior profile.

In a fifth implementation of the context information processor according to the first aspect as such or according to any of the preceding implementations of the first aspect, the context information processor is configured to update a counter that corresponds to an inactive behavior profile if the context information complies with an inactive behavior profile.

This has the advantage that information can be collected about which inactive behavior profile actually corresponded to the determined context information of the user.

The context information processor of the fifth implementation can determine the active behavior profile from a list of behavior profiles e.g. based on a time of day, a weekday information, and/or a location of the user.

For example, a user may have a first behavior profile which corresponds to "no movement" and which is active during office hours during week days, when the user is sitting in the office. There can be a second behavior profile which corresponds to "movement by car and/or foot" and which is active on weekends, when the user typically goes shopping or performs free time activities.

In a sixth implementation of the context information processor according to the first aspect as such or according to any of the preceding implementations of the first aspect, the context information comprises at least one of the following: a network measurement and/or a network information, in particular at least one of the following: a received signal strength, a RSRP value, a RSRQ value, a backhaul link capacity, a backhaul link quality, a packet loss value, a transmission delay value, an interface information, an associated cell ID, a Mobile Country Code, and a Mobile Network Code (MNC), a mobility information, in particular at least one of a user speed and a number of handovers, a service measurement information, in particular at least one of the following: an accessed service type, an accessed service duration, an accessed service characteristic, in particular at least one of a packet size, a packet transmission interval, a packet reception interval, an uplink and/or downlink bit rate, an acceptable jitter, an acceptable packet loss, and an acceptable packet error rate, a social information, in particular at least one of the following: an age, an employment and/or a profession, an education, an income, and a gender, a user contract information in particular at least one of the following: a contract Id, a signature and an expiration date, a charging information and/or a charging data record, in particular at least one of a charging model and an available credits, a user equipment information, in particular at least one of the following: an available battery information, a maximum battery charging information, a device central processing unit description, a memory information, an operating system information, a screen size information, a screen resolution, and a power and/or energy information, in particular at least one of: a battery consumption rate, a battery level, and a current CPU level, an information about protocols supported by the user equipment (in particular a type of protocol, a required memory and/or a required CPU), an information about physical interfaces offered by a device (in particular at least one of the following: an uplink rate, a downlink rate, a round trip delay, a transmission error information, a packets sent information, a packets received information), and a timing information.

The above examples of context information are valuable information for the operation and distribution of resource in the communication network.

In a seventh implementation of the context information processor according to the first aspect as such or according to any of the preceding implementations of the first aspect, the determination unit comprises a receiver configured to receive the context information from a node in the communication network.

Thus, the context information processor of the seventh implementation can aggregate and/or transmit context information from different nodes in the communication network.

In an eighth implementation of the context information processor according to the first aspect as such or according to any of the preceding implementations of the first aspect, the transmitter is configured to transmit the context information and/or a consistency index of the active behavior profile to a second context information processor.

Thus, a plurality of context information processors can form a chain, wherein the context information can be forwarded from one context information processor to the next, within the communication network.

In a ninth implementation of the context information processor according to the first aspect as such or according to any of the preceding implementations of the first aspect, the context information processor further comprises a behavior profile store configured to store a plurality of behavior profiles, wherein the context information processor is configured to update the active behavior profile if the context information does not comply with the active behavior profile.

Thus, the context information processor can use the received context information to update behavior profiles. The context information processor can optionally further comprise a behavior profile distribution unit, which can be configured to distribute the updated behavior profile within the communication network.

A second aspect of the application refers to a node, in particular a user equipment, an eNodeB, a mobility management entity or a charging gateway, in a communication network, the node comprising a context information processor according to the first aspect or one of its embodiments.

Thus, the context information processor can be integrated within an existing node in a communication network. Preferably, the context information processor can be realized in memory of the node, wherein the memory can be upgraded via a firmware upgrade. Thus, existing nodes can be upgraded to comprise a context information processor.

A third aspect of the application refers to a behavior profile distribution unit for a communication network, comprising: a receiver configured to receive aggregated context information, a processor configured to update a behavior profile based on the aggregated context information, and a transmitter configured to transmit the updated user profile to one or more nodes in the communication network, wherein the aggregated context information comprises a consistency index which indicates a consistency of a behavior of the user with an active behavior profile.

The behavior profile distribution unit of the third aspect can derive from the consistency index how consistent the behavior of the user is with the active behavior profile. Thus, the behavior profile distribution unit can learn about the users compliance with the behavior profile without receiving all details of context information. For example, the behavior profile distribution unit does not need to receive exact time stamps of when what behavior of the user was observed. Instead, the behavior profile distribution unit can determine all required information from the aggregated context information which comprises the consistency index.

A fourth aspect of the application refers to a method for transmitting context information of a user in a communication network, the method comprising: determining a context information of a user, evaluating whether the context information of the user complies with an active behavior profile of the user, and transmitting the context information of the user if the context information does not comply with the active behavior profile.

In particular, the method can comprise transmitting the context information only if the context information does not comply with the active behavior profile.

In a first implementation of the method of the fourth aspect, the method further comprises a step of selecting the active behavior profile from a list of behavior profiles, in particular based on a time and/or location of the user.

The methods according to the fourth aspect of the application can be performed by the context information processor according to the first aspect of the application. Further features or implementations of the method according to the fourth aspect of the application can perform the functionality of the context information processor according to the first aspect of the application and its different implementation forms.

A fifth aspect of the application refers to a computer-readable storage medium storing program code, the program code comprising instructions for carrying out the method according to the fourth aspect.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, but modifications on these embodiments are possible without departing from the scope of the present application as defined in the claims.

FIG. 9A shows two behavior profiles in accordance with an embodiment of the present invention, FIG. 9B to FIG. 9F show items for transmission in accordance with further embodiments of the present invention, FIG. 10 to is a flow chart of a method of redundancy removal on a per CIP identifier level in accordance with a further embodiment of the present invention.

DETAILED DESCRIPTION OF ILLUSTRATIVE EMBODIMENTS

Figure 1:
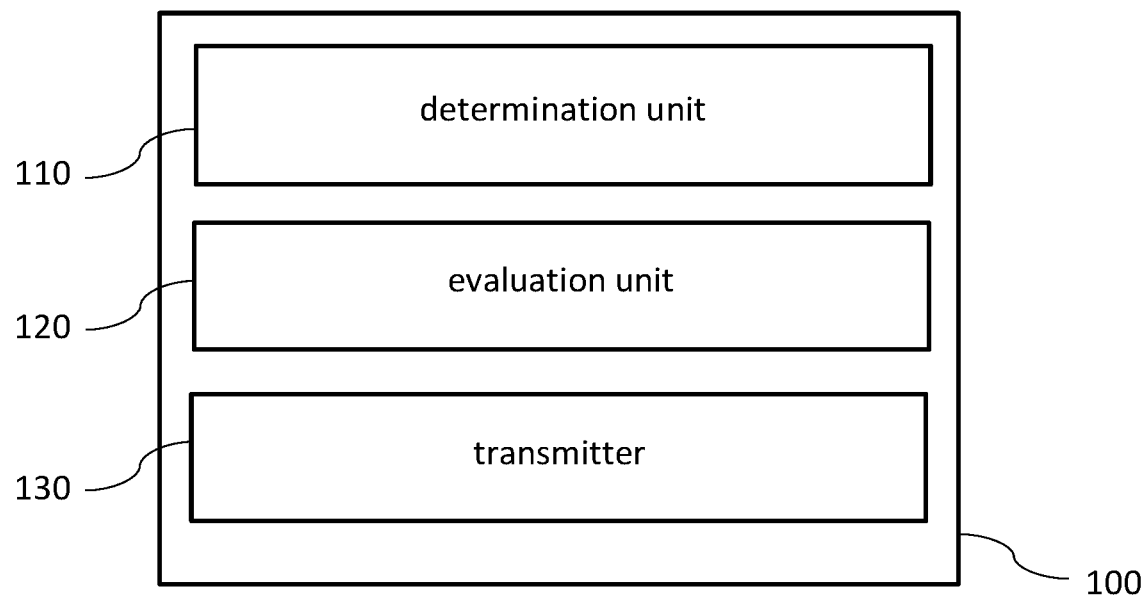
FIG. 1 is a block diagram illustrating a context information processor in accordance with an embodiment of the present invention.

FIG. 1 shows a context information processor 100 for a communication network. The context information processor 100 can be part of a node in the communication network (not shown in FIG. 1).

The context information processor 100 comprises determination unit 110, an evaluation unit 120 and a transmitter 130. It is understood that the transmitter 130 does not need to be transmitter that is used only be the context information processor 100. For example, if the context information processor is realized in an eNodeB, typically the transmitter 130 would be the transmitter of the eNodeB. The determination unit 110 and the evaluation unit 120 could be realized as executable code in a memory of the eNodeB.

The determination unit 110 is configured to determine a context information of a user. For example, the determination unit 110 can determine the context information from measurement information available at the context information processor. In other embodiments, the determination unit 110 can comprise a receiver which is configured to receive the context information from a different node in the communication network.

The evaluation unit 120 is configured to evaluate whether the context information of the user complies with an active behavior profile of the user. For example, the active behavior profile can be a selected behavior profile from a set of behavior profiles of the user. Each of the behavior profiles can define a parameter range. Thus, the evaluation unit 120 can be configured to compare a measured context information of the user with the parameter range of the active behavior profile. If the measured context information falls within the parameter range of the active behavior profile, the context information is considered to comply with the active behavior profile. Otherwise, it is considered not to comply with the active behavior profile.

The transmitter 130 is configured to transmit the context information, wherein the transmitter is configured not to transmit the context information if the context information complies with the active behavior profile. In other words, the transmitter may be configured to transmit the context information only if the context information processor does not comply with the active behavior profile.

Context information refers to information that is used for executing control or management functions. This context information can be accessed and used in real time for enabling more targeted and sophisticated decision making. Context information is exchanged among the network entities, even heterogeneous ones so as to solve challenging networking problems such as management and control of the network resources. The context information may be used for the optimization of the network management and control including but not limited to radio measurements (e.g. one or more of RSS, RSRP, RSRQ), information related to the radio access network status (e.g. backhaul/fronthaul link capacity and usage, number of (un)successful calls/session establishments, handovers, PDCP and RLC counters), mobility information (e.g. user speed and/or number of handovers, number of location updates), power and/or energy information (e.g. battery consumption rate and/or battery level), charging information (e.g., call detail records, or collection of any chargeable information).

Figure 2:
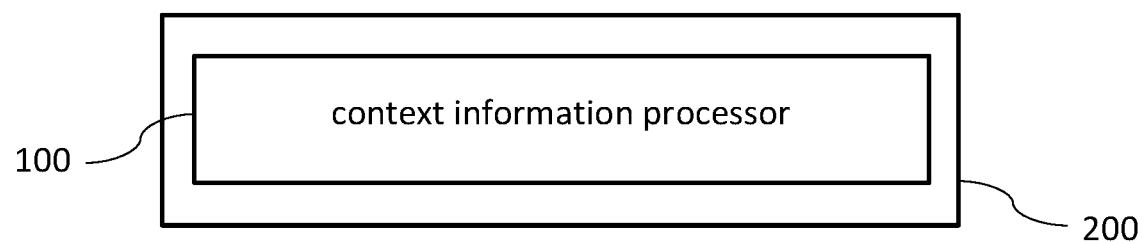
FIG. 2 is a block diagram illustrating a node in accordance with a further embodiment of the present invention.

FIG. 2 shows a node 200, in particular an eNodeB, a mobility management entity, a charging gateway, or any other networking device which produces or transfers context information, in a communication network, the node comprising a context information processor, e.g. the context information processor 100 of FIG. 1.

Figure 3:
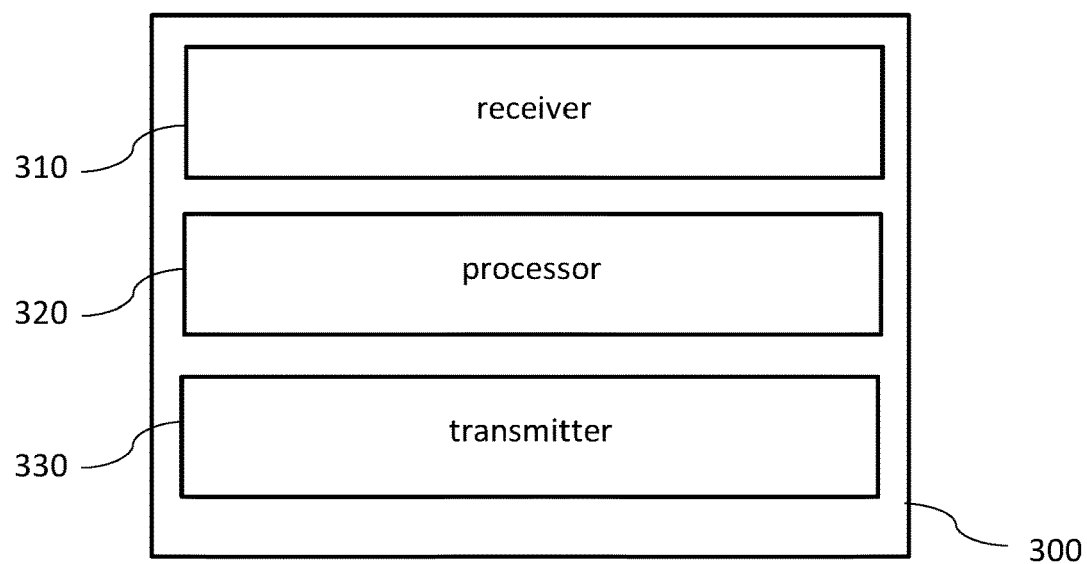
FIG. 3 is a block diagram illustrating a user profile distribution unit in accordance with a further embodiment of the present invention.

FIG. 3 shows a user profile distribution unit 300 for a communication network.

The user profile distribution unit 300 comprises a receiver 310, a processor 320 and a transmitter 330.

The receiver 310 is configured to receive aggregated context information. For example, it can be configured to receive the aggregated context information from a different node in the communication network. The aggregated context information may comprise a consistency index which indicates a consistency of a behavior of the user with an active behavior profile.

The processor 320 is configured to update a behavior profile based on the aggregated context information. For example, the processor 320 can be configured to update the active behavior profile based on the aggregated context information.

The transmitter 330 is configured to transmit the updated user profile to one or more nodes in the communication network.

Figure 4:
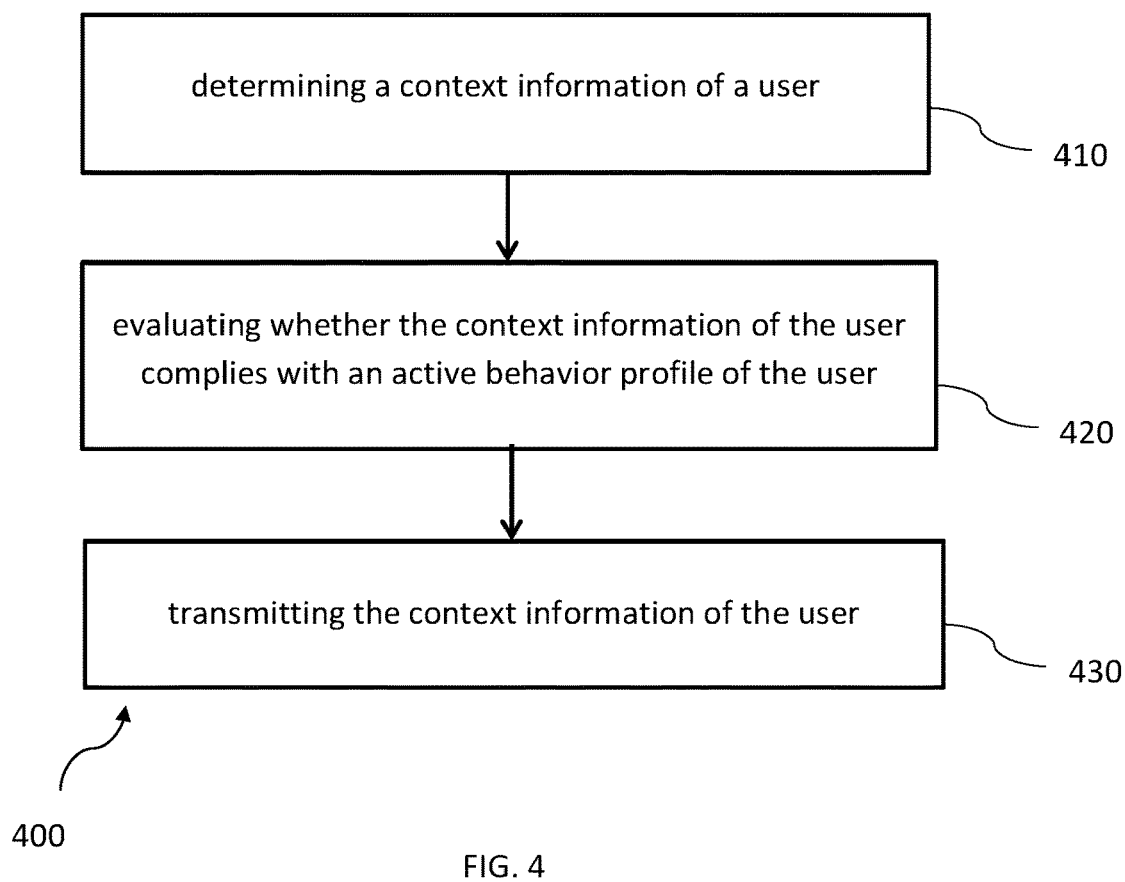
FIG. 4 is a flow chart of a method for transmitting context information in accordance with a further embodiment of the present invention.

FIG. 4 shows a method 400 for transmitting context information of a user in a communication network. The method may be implemented e.g. by the context information processor 100 of FIG. 1.

The method comprises a first step 410 of determining a context information of a user.

The method comprises a second step 420 of evaluating whether the context information of the user complies with an active behavior profile of the user.

The method comprises a third step 430 of transmitting the context information of the user, wherein the context information is not transmitted if the context information complies with the active behavior profile.

The method 400 may be carried out periodically or on demand. In particular, the method may comprise an initial step (not shown in FIG. 4) of waiting to receive context information from one or more other nodes in the communication network.

The method 400 enables network information exchange among network entities for context-aware resource management by exploiting context information processing and prediction of the user behavior.

The method 400 can handle the problem of signaling overhead for network context information sharing towards any component that needs to process information (e.g. centralized or decentralized context extraction entities) by incorporating data aggregation and pre-processing techniques.

Optionally, the method can comprise aggregating and compressing mobile network-related context information per a unique identifier. Such identifier in the case of User Equipment could be the International Mobile Subscriber Identity (IMSI), but any other unique identifier could be used for differentiating the devices which produce and distribute the context information. Techniques related to identifying and discarding redundant or unnecessary context information can also be implemented.

Figure 5:
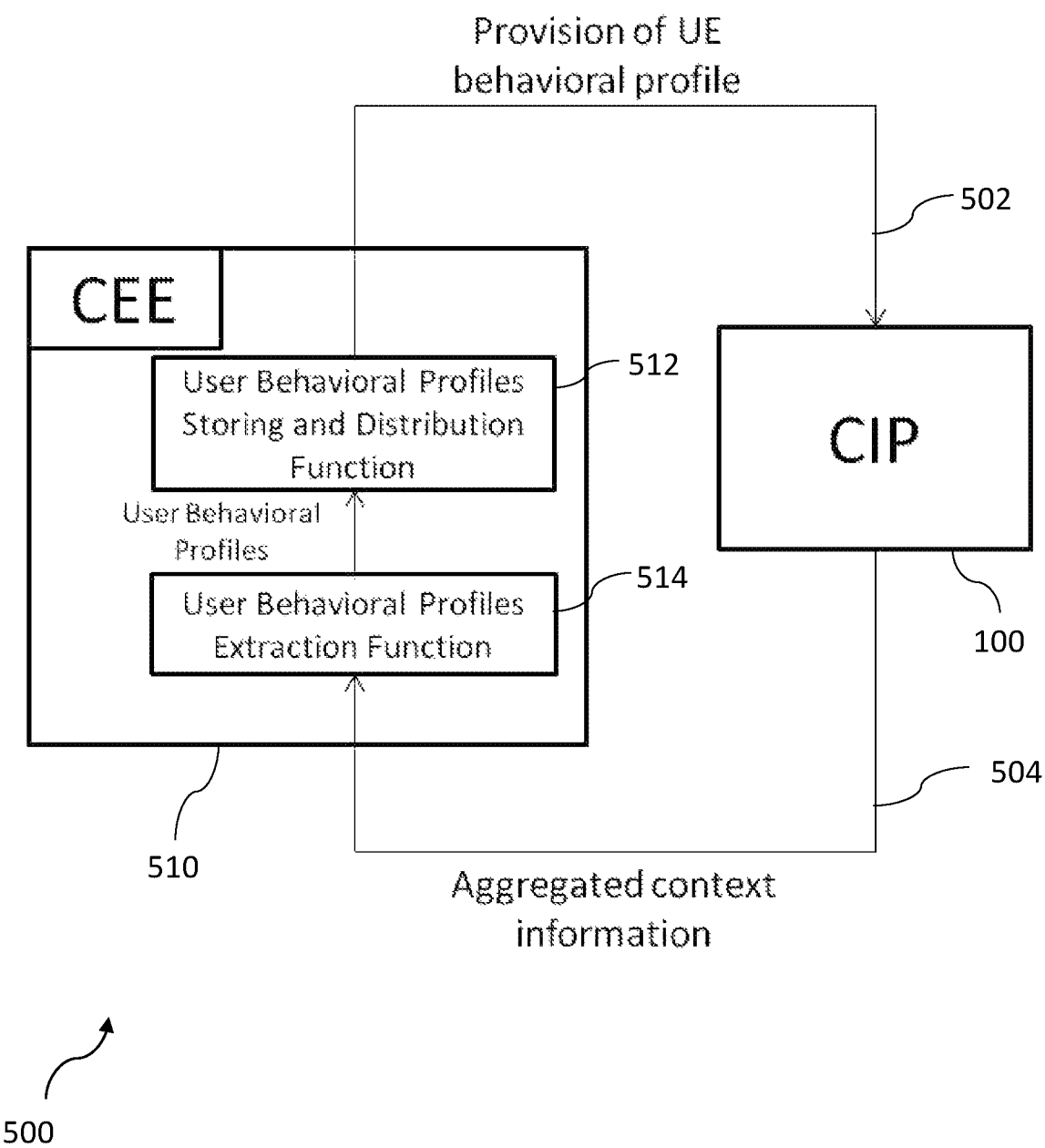
FIG. 5 is a simplified diagram illustrating an indicative implementation, where a CEE incorporates both functions of "User Behavioral Profiles Extraction", and "User Behavioral Profiles Storing and Distribution" in accordance with a further embodiment of the present invention.

FIG. 5 provides an indicative implementation of the proposed application. In this implementation the CEE incorporates both functions of "User Behavioral Profiles Extraction", and "User Behavioral Profiles Storing and Distribution".

The system 500 of FIG. 5 comprises a content extraction engine, CEE, 510 and a context information processor, CIP, 100.

The CEE 510 comprises a first unit 512 that implements a user behavior profile storing and distribution function and a second unit 514 that implements a user behavior profiles extraction function. The second unit extracts behavior profiles from the aggregated context information 504 that it receives from the CIP 100. For example, the second unit 514 can be configured to determine behavior profiles that best describe the user behavior. These behavior profiles can then be stored in the first unit 512, which can be configured to provide the behavior profiles 512 to the context information processor 100.

The proposed method can optimize the context aggregation through a logically centralized function. This function can aggregate context information and process it offline, thus enabling the information collection with certain time delays and can be referred to as "User Behavioral Profiles Extraction Function". The information that is collected for being processed is typically user-related historical context information. This function processes the available information and builds user behavior profiles that enable the prediction of the user behavior. Once these profiles are built, they are transferred to the function that is responsible for storing and distributing the behavior profiles can be referred to as "User Behavioral Profiles Storing and Distribution Function". The latter is responsible for providing the profiles to other networking entities, either with or without request. These two functions may be co-located or reside in different networking entities.

In one exemplary implementation of the proposed mechanisms, these two functions could reside in one networking entity called Context Extraction Engine (CEE). This engine is both responsible for extracting the context and distributing it to other networking elements. The CEE may implement both functions.

In embodiments of the invention, the context information processor, CIP, may implement the following functionalities: identifying and discarding redundant or unnecessary data, while transmitting to the CEE only the amount of redundant data that was discarded, aggregating and compressing context information per a unique identifier, such as IMSI, GUTI, etc. as well as other parameters, such as location.

The CIP functionalities may be deployed for example in any of the network's entities that may contain UE related data in order to perform pre-processing techniques and redundant information identification.

The information that is collected in the CEE per user equipment may include, but is not limited to at least one of the following: a network measurement and/or a network information, in particular at least one of the following: a received signal strength, a RSRP value, a RSRQ value, a backhaul link capacity, a backhaul link quality, a packet loss value, a transmission delay value, an interface information, an associated cell ID, a Mobile Country Code, and a Mobile Network Code (MNC), a mobility information, in particular at least one of a user speed and a number of handovers, a service measurement information, in particular at least one of the following: an accessed service type, an accessed service duration, an accessed service characteristic, in particular at least one of a packet size, a packet transmission interval, a packet reception interval, an uplink and/or downlink bit rate, an acceptable jitter, an acceptable packet loss, and an acceptable packet error rate, a social information, in particular at least one of the following: an age, an employment and/or a profession, an education, an income, and a gender, a user contract information, in particular at least one of the following: a contract Id, a signature and an expiration date, a charging information and/or a charging data record, in particular at least one of a charging model and an available credits, a user equipment information, in particular at least one of the following: an available battery information, a maximum battery charging information, a device central processing unit description, a memory information, an operating system information, a screen size information, a screen resolution, and a power and/or energy information, in particular at least one of: a battery consumption rate, a battery level, and a current CPU level, an information about protocols supported by the user equipment (in particular a type of protocol, a required memory and/or a required CPU), an information about physical interfaces offered by a device (in particular at least one of the following: an uplink rate, a downlink rate, a round trip delay, a transmission error information, a packets sent information, a packets received information), and a timing information.

Figure 6:
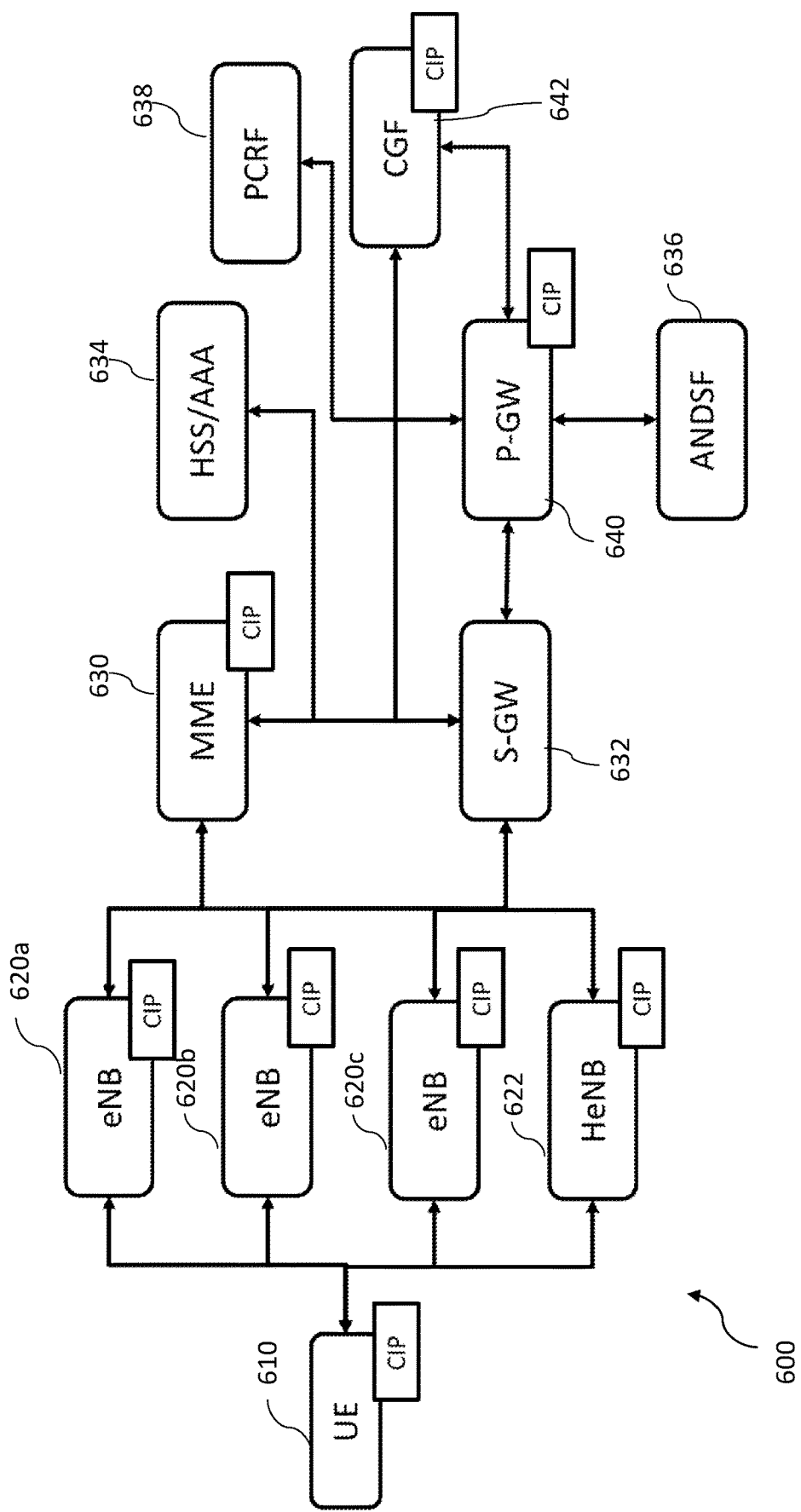
FIG. 6 is a block diagram illustrating a potential deployment of a context information processor in LTE/LTE-A network in accordance with a further embodiment of the present invention.

FIG. 6 shows an exemplary implementation in a LTE/LTE-A network for gathering the information to the CEE, which as mentioned before can be a logically centralized network entity which communicates logically with the CIPs, either directly, or through other CIPs.

The exemplary illustration of system 600 of FIG. 6 comprises a UE 610 which comprises its own context information processor and which is configured to communicate with three eNodeBs 620a, 620b, 620c. It may also communicate with a Home eNodeB 622. Each of these nodes comprises its own context information processor.

The context information processor of the UE 610 may carry out aggregation of context information before forwarding aggregated context information to one of the abovementioned eNodeB of the communication network. These can further aggregate context information, e.g. context information from different users, before forwarding them to a mobility management entity 630 or a S-GW 632. The aggregated context information may then be passed through to further units 634 to 642 in the communication network.

As depicted, CIPs may reside in entities where the aforementioned information elements could reside. In other potential implementations the CIPs could reside to any networking device that could provide information related to user context, including but not limited to servers, databases, access nodes, user equipment, etc.

Each CIP in the communication network may be configured to aggregate context information per a unique user identifier and in the aggregated information it may identify redundant or unnecessary data and discard it. The aforementioned unique identifier may be the user IMSI or any other unique identifier for the user, so as to indicate that this context information refers to a certain user.

Once the CEE has determined a user behavior profile, it can be configured to distribute the profiles to the networking elements that may contain or obtain information related to certain user. The distribution of the profiles to the networking elements may be on demand, or automatically (e.g., periodically, or when the CEE has updated user behavior profiles, etc.) from the CEE.

As described before, the user predicted behavior includes the preferences/predictions in relation to several communication characteristics, including but not limited to expected services to be accessed, the access rate, access duration, user mobility, etc. The user behavior prediction may be based only on the behavior profile, or one of the behavior profile and real time information. Then, the corresponding CIPs that reside in these networking elements can be configured to consider the user behavior profile and the respective predicted behavior and will discard any redundant information. In embodiments, redundant information may refer to any information that is in accordance with the active behavior profile.

Figure 7:
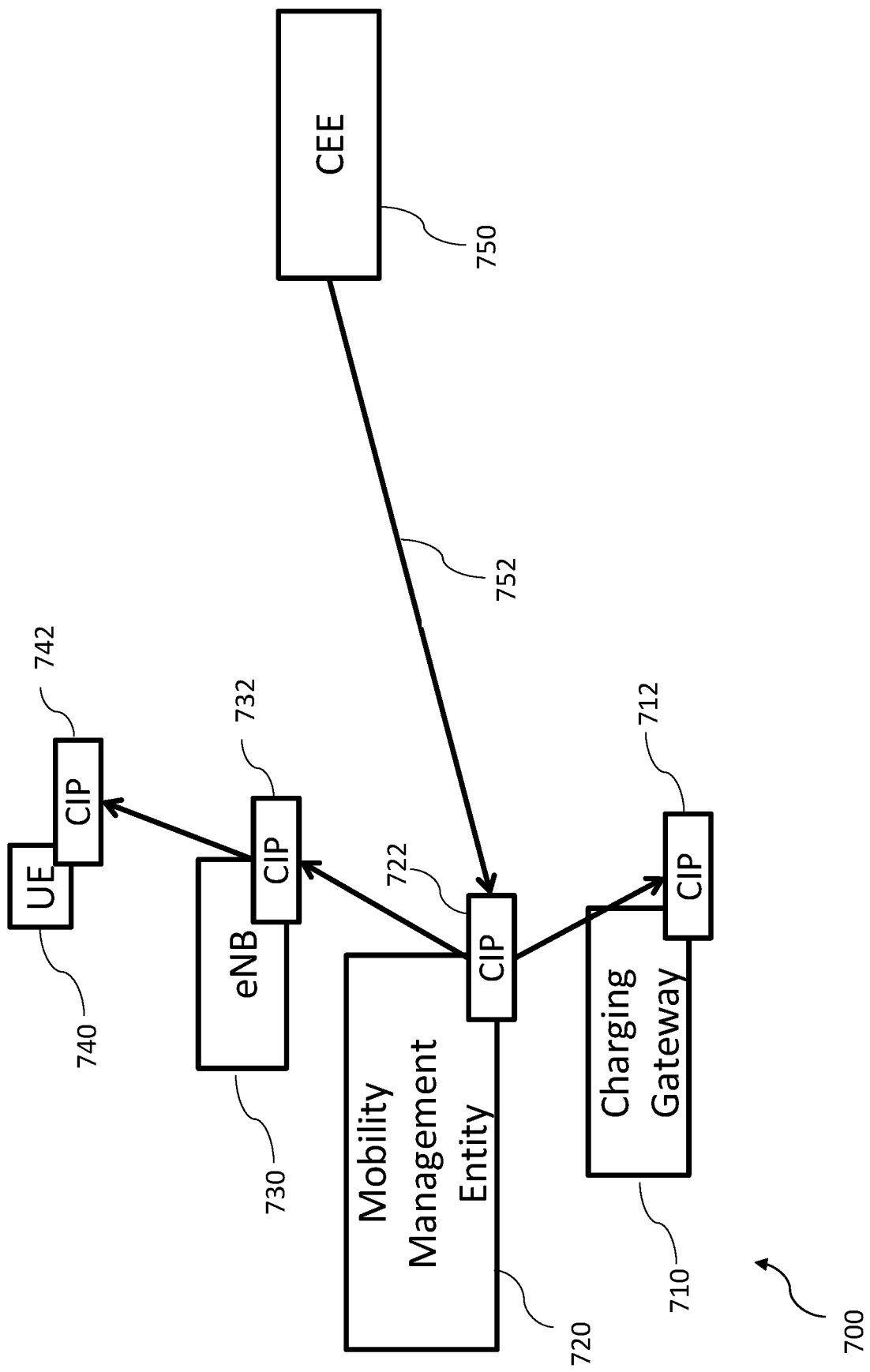
FIG. 7 is a block diagram illustrating a implementation of user behavior profiles distribution in accordance with a further embodiment of the present invention.

FIG. 7 provides an exemplary implementation of the distribution of the profiles in LTE/LTE-A networking elements. The system 700 shown in FIG. 7 comprises a charging gateway 710, a mobility management entity 720, an eNodeB 730 and a user equipment 740. Each of these nodes comprises a CIP, denoted with reference numbers 712, 722, 732 and 742, respectively.

The system 700 further comprises a CEE 750 which, as indicated with arrow 752, distributes the behavior profiles to the CIP 722 located at the mobility management entity 722.

The distribution of the profiles could be either via direct communication or through other networking elements and the respective CIPs. In the depicted exemplary implementation the behavior profiles are distributed through one CIP 722 that resides in a certain networking element (in this exemplary implementation in the Mobility Management Entity—MME 720). However, similar implementations could be applied to any type of networking deployments.

Figure 8:
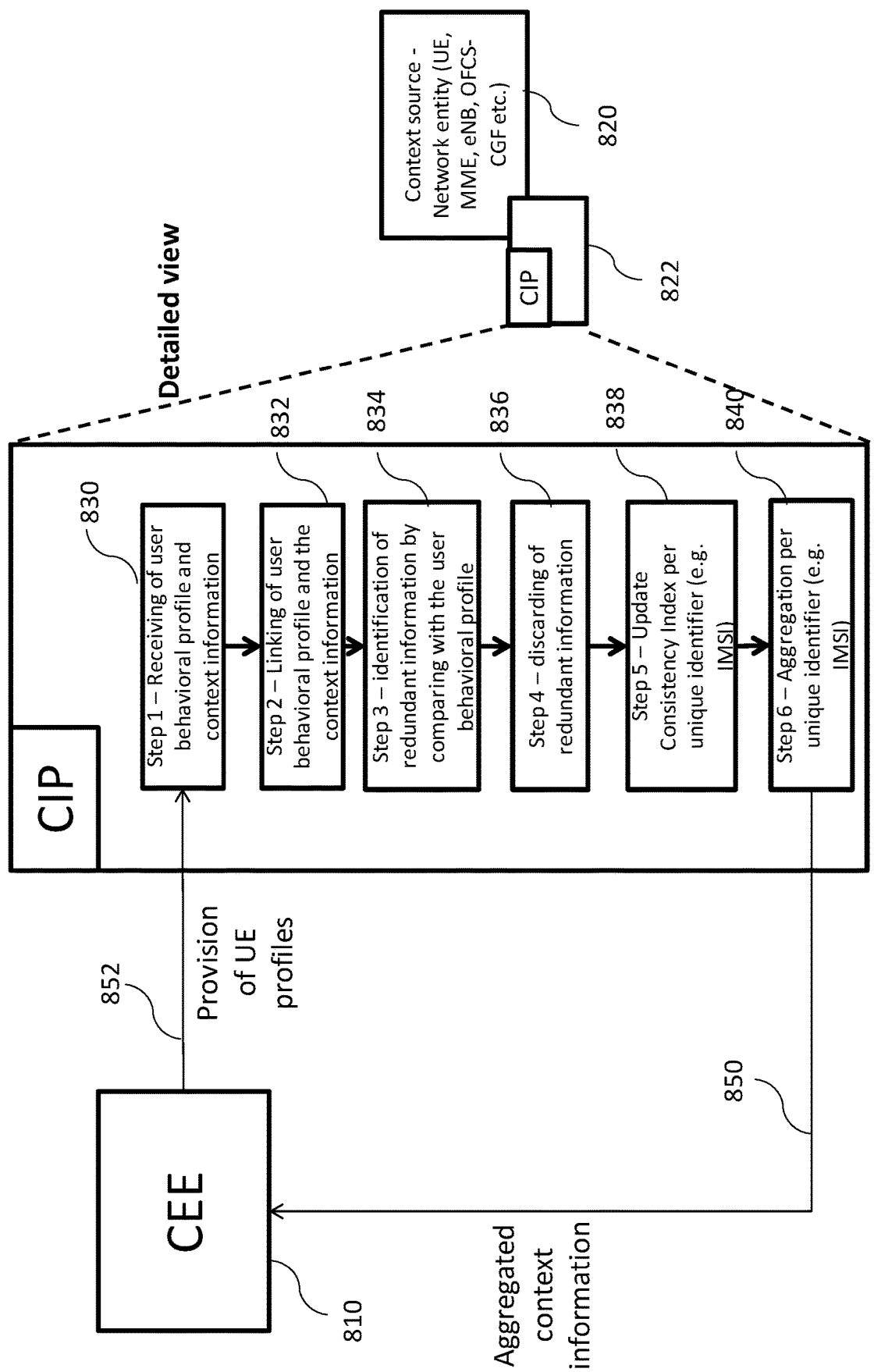
FIG. 8 is a simplified diagram illustrating steps of redundancy removal process in context information processor in accordance with a further embodiment of the present invention.

FIG. 8 illustrates in detail steps carried out by a context information processor (CIP), when deployed in a network entity acting as source of context information to be transmitted to the CEE (either directly or via other CIPs).

In particular, the CIP 822 that is located at a context source 820 is implemented to carry out the following steps: a first step 830 comprises receiving of at least one user behavior profile and context information related to the respective profile, a second step 832 comprises linking of user behavior profile (and the predicted behavior) and the context information for the respective user, a third step 834 comprises comparing context information with the respective user behavior profile and identification of redundant information, a fourth step 836 comprises discarding of redundant information, a fifth step 838 comprises updating a consistency index according to the discarded information, and a sixth step 840 comprises aggregating per a unique identifier, such as the IMSI.

Since each user may have more than one behavior profile related to the context information (e.g., location, time periods, date, battery level, etc.), and each CIP may have several user behavior profiles that refer to one or more users, when the CIP has to provide context information to the CEE 810 (first step 830), it links the context information with the respective user behavior profile (second step 832). The forwarding of behavior profiles from the CEE 810 to the CIP 822 is indicated with arrow 852.

The above implies that the CIP will map the context information to be transmitted with the predicted behavior of the user under certain preconditions that refer to the process that produced the context information. Then, by comparing the context information of the user, which is the actual behavior of the user with his predicted one (represented by the user behavior profile), the CIP identifies the redundant information (third step 834).

Specifically, when a user complies with his predicted behavior, this information is considered redundant and may be discarded (fourth step 836). When the user does not comply with his predicted behavior, then this information is not redundant and has to be collected by the CEE 810 so as to be considered in the user behavior profile extraction process from the "User Behavioral Profiles Extraction Function". Each time redundant data is discarded, a consistency index (CI) is updated for the associated user identifier. Only not redundant data and the Consistency Index are transmitted to the CEE either directly or through other CIPs (fifth step 838). The forwarding of aggregated context information to the CEE 810 is indicated with arrow 850.

In one exemplary implementation, when the user behavior is described by the user mobility and the service that the user accesses in a certain time period, then his behavior could be described by two behavior profiles as depicted in FIG. 9A for two certain time periods.

When the user is in time period A (e.g., 9:00-12:00) of a Day A (e.g., Monday) he is predicted to have Mobility profile A and access Services described by profile A (e.g., long voice calls). The UE behavior may move towards three directions: he will follow his behavioral profile, he will have a totally different behavior, or, he will be inactive.

In this exemplary implementation for enabling the CEE to build the behavioral profiles using context extraction mechanisms, if CIP are not applied, all the user actions should be recorded in the user side with the certain timestamps and be transmitted to the CEE.

FIG. 9B describes the records in a UE where the behavior of a UE with IMSI A, is described in terms of accessed services and mobility for several timestamps (TS1-TS12). Then, the CIP will identify the information that is redundant and could be discarded. When the UE follows his active behavioral profile, then he does not need to transmit this information, since he complies with the predicted behavior (as indicated in the active behavior profile). Instead it will increase the Consistency Index, which can be implemented as a counter capturing the times that the UE is compliant to its predicted behavior. This can be necessary for the CEE to be able to reconstruct the overall user behavior (including the inactivity and the deviations from the profile) (FIG. 9B).

Specifically, in the presented example, the UE CIP would transmit a structure which would contain, (a) only once the UE IMSI (IMSI A), (b) the Consistency Index for the times that the UE followed the active behavior profile (i.e., 5), and (c) an indication of mobility and used service for the 5 times that the UE deviated from the active behavior profile (FIG. 9C).

This information can be transferred to the other CIPs (e.g., the CIP of the eNB) either periodically or on demand. The other CIPs may collect several records; they will aggregate this information, and they will discard redundant information before sending it to other CIPs.

In one alternative implementation the CEE may provide to the CIPs the predicted behavior of the user (see FIG. 9A) in one table with other predicted behavioral profiles, as shown in FIG. 9D.

Since the context information does not have to be provided to the CEE in real time, but it may be provided offline, this enables the aggregation of context information on a per CIP basis as well. Specifically, the context information may be transferred to the CEE via several CIPs. This facilitates the above procedure to take place in all the CIPs until the context information reaches the CIP. Each CIP provides the aggregated information to another CIP so as to be forwarded to the CEE is implementation specific. Potential implementations include but are not limited to periodically transmission of aggregated information, transmission after certain amount of information has been aggregated, etc. This enables each CIP to aggregate information on a per unique identifier basis. For example, if a CIP residing in an eNB aggregates context information for a UE that is associated to this eNB then the associated cell ID can be discarded, since it is redundant. This process is redundancy identification per CIP identifier.

Figure 10:
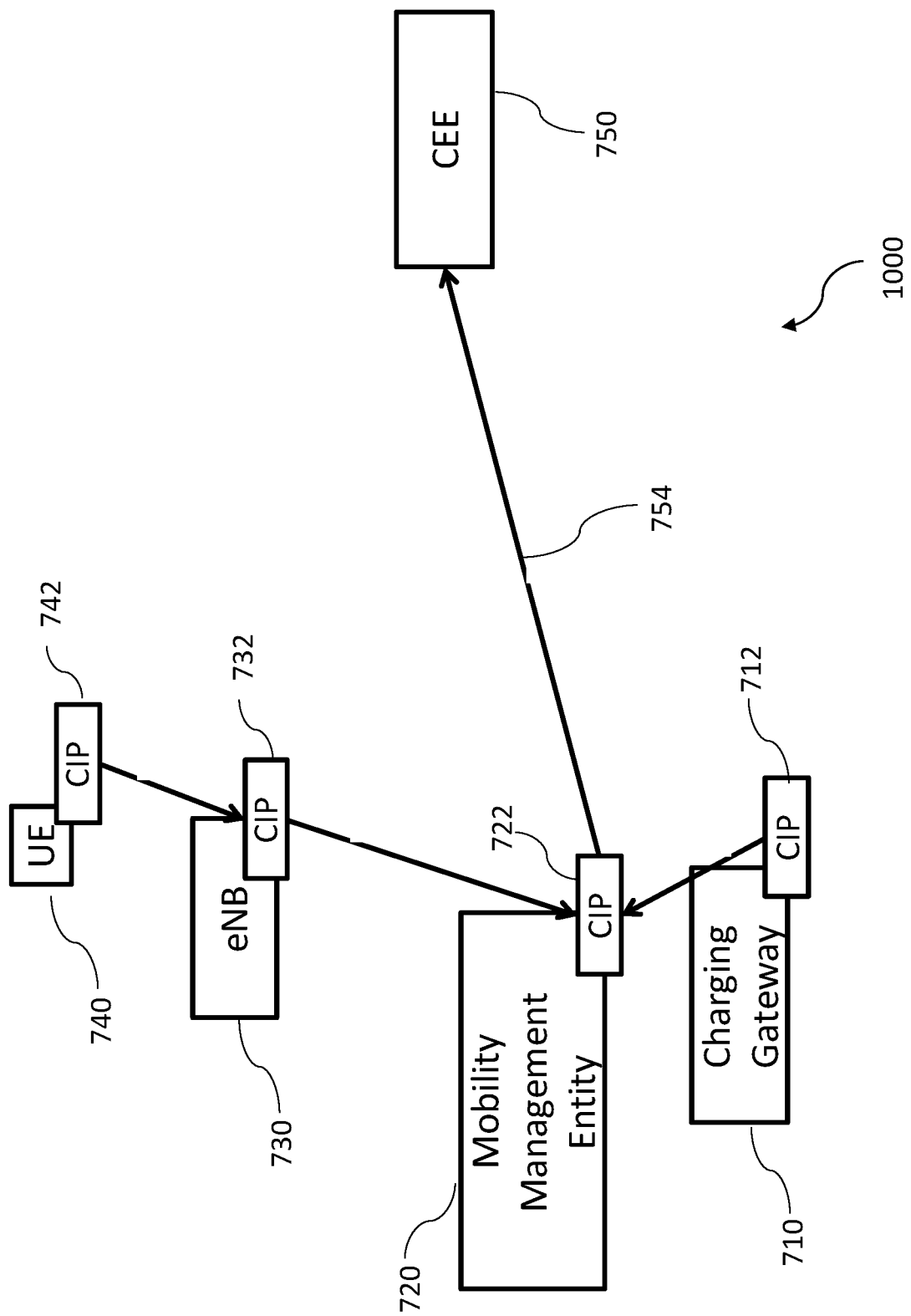

Similar redundancy identification apart from per networking element identifier may be extracted per location (e.g., Mobile Country Code (MCC), Mobile Network Code (MNC), date, time, etc. One exemplary implementation of this procedure is depicted in FIG. 10 for a system 1000 that has similar components as the LTE/LTE-A network of FIG. 7.

As it is depicted, context information (upon removing redundant information) is being transferred from the CIP 742 that resides in the UE 740 to the CIP 732 that resides in the eNB 730. The CIP 732 that resides in the eNB 730 aggregates context information and removes redundant information on per eNB identifier, per location and per time basis.

Then (after a certain time interval or on a per aggregated data volume basis) the aggregated information (that contains context for many UEs) is being transferred from the CIP 732 that resides in the eNB 730 to the CIP 722 that resides in the MME 720 where the same procedure is followed and redundant information is being discarded. As it is shown in FIG. 7, the MME 720 may receive information from CIPs 712 that reside in other types of networking elements (such as charging gateway 710). Then the overall aggregated information for many CIPs is being transferred to the CEE 750, as indicated with arrow 754.

Once the CEE 750 receives the aggregated context information, it may reproduce the original dataset, by using the consistency index. As mentioned before, the consistency index can be implemented as an index that is being increased each time information is being discarded because it is redundant. Then for reproducing the original context information, the data has to be reproduced as many times as they are indicated by the consistency index.

Figure 11:
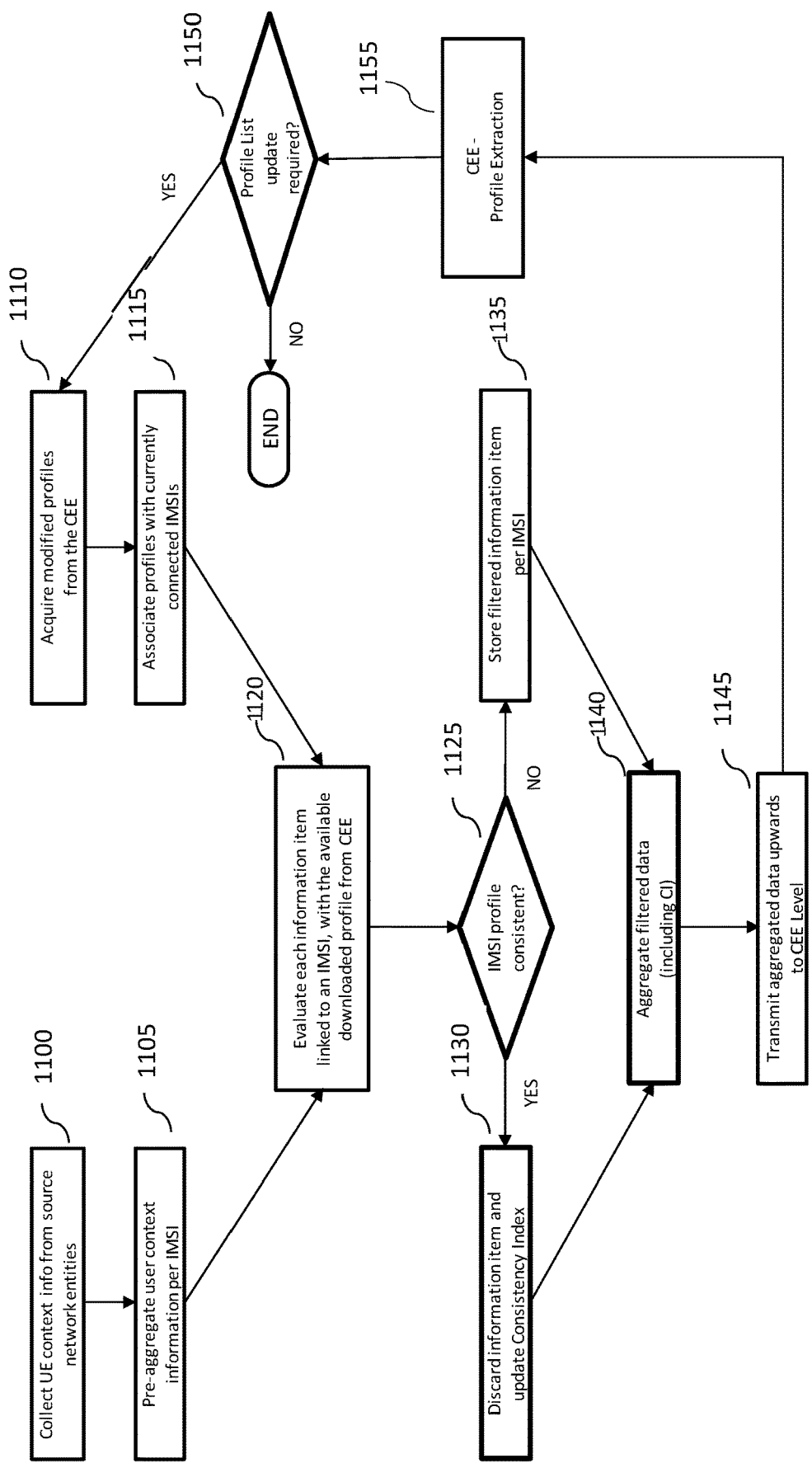
FIG. 11 is a flow chart of a further method in accordance with a further embodiment of the present invention.

FIG. 11 is a flow chart of a method that involve updating a consistency index. In particular, the method involves: Step 1100: via the respective interfaces the user behavior profiles are provided (pulled/pushed) to the respective CIP mechanism. As mentioned earlier, the user behavior profiles may vary in relation to several parameters including but not limited to UE location, mobility state, remaining credits of the user account, etc. Step 1105: aggregation in the CIP of all context data required by the CEE. The context is collected and stored per UE. In order to avoid random transmission of context information related to a specific UE, this information is aggregated for each UE and transmitted as one element. Step 1110: via the respective interfaces the CEE prior extracted profiles are provided and stored in the CIP. In order to identify the redundant information, the acquired context data should be juxtaposed by the function to the already extracted UE profiles. Step 1115: for each unique identifier for which there is available context information the CIP makes an association between it and the respective user behavior profile that has been stored after received from the CEE. Step 1120: any new information item that is transmitted to the CIP (associated with a unique identifier) is linked to the respective user behavior profile that is stored. Step 1125: any new information item is evaluated by CIP in terms of consistency with the existing user behavior profile (in terms of the respective parameter value, such as mobility state, service, other user preferences, etc.). Step 1130: if the information item that is evaluated is consistent with the respective unique identifier linked user behavior profile, discard the payload of the information item and update the Consistency Index (CI). Information items consistent with the respective CEE profiles do not provide gain in the context extraction processes. Step 1135: if the information item is not consistent, it should be stored and transmitted to the CEE, directly or through other CIPs, to update the previous profile. Step 1140: aggregate the data per unique identifier (e.g., IMSI) (inconsistent data and Consistency Index). Step 1145: the pre-processed and aggregated information is transmitted via the respective interfaces upwards to the CEE, wherein in step 1155, an extraction of behavior profiles can be performed. Step 1150: only if there is an updated profile list extracted from the CEE, the modified profiles only are pushed and update the CIP's profile database.

In other implementations where the CEE provides the Predicted behavioral profiles to the CIPs then in the step 1125 instead of simply evaluating the consistency with the UE behavioral profile, the CIP also updates the counters for each profile ID. Afterwards, in step 1140 the filtered data are aggregated for a certain IMSI including the consistency index and the Counters for each profile ID.

As outlined above, embodiments of the invention may include: A Context Extraction Entity (CEE), which can be a logically centralized entity which produces and distributes the user behavior profiles to the network entities. The function of producing the user behavior profiles can be referred to as "User Behavioral Profiles Extraction Function", whereas the function for storing and distributing the behavior profiles can be referred to as "User Behavioral Profiles Storing and Distribution Function". These two functions may reside in the CEE or may be located in different logically centralized entities. In the current implementation we assume that both functions are located in the CEE. The way that the user behavior profiles are produced may be based on mechanisms coming from various scientific fields (e.g., data analytics, statistical analysis, probabilities, etc.). One or more Content Information Processing (CIPs) mechanism components, which process the context and discard redundant information. The process of context information can considers the predicted behavior as indicated by the active behavior profile.

Methods in accordance with the present application may also comprise: mechanisms for gathering required information from various network points (such as user equipments, base stations, mobility servers, databases etc.), methods for data processing for identifying and discarding the redundant information on user predicted behavior, methods for data processing for aggregating and compressing the transmitted information on a per specific identifier basis, mechanisms to reproduce in the centralized entity that collects the information from source network entities the amount of the data that was discarded.

Some benefits expected from the proposed mechanisms are signaling reduction in the context information transfer phase. The range of the benefit varies based on the compliance of a UE to his predicted behavior. In cases where the user is fully compliant to his predicted behavior, then only his unique identifier and the respective CI with timing information have to be transmitted. Additionally, embodiments present significant gains since they can use information aggregation and redundancy removal. This implies that the more aggregation steps are used, the more redundant information is being discarded.

The foregoing descriptions are only implementation manners of the present application, the scope of the present application is not limited to this. Any variations or replacements can be easily made through person skilled in the art. Therefore, the protection scope of the present application should be subject to the protection scope of the attached claims.

What is claimed is:

1. A context information apparatus for a communication network, comprising:
 a processor; and
 a non-transitory computer-readable storage medium storing a program to be executed by the processor, wherein the program, when executed in the processor, is configured to cause the processor to:
  determine a context information of a user, and
  evaluate whether the context information of the user complies with an active behavior profile of the user,
  update a consistency index of the user in response to determining that the context information complies with the active behavior profile; wherein updating the consistency index comprises increasing the consistency index, the consistency index being implemented as a counter capturing a number of times that the user is compliant to its predicted behavior, and
  cause a transmitter to transmit the context information and the consistency index to a content extraction engine, in response to determining, based on the evaluating, that the context information does not comply with the active behavior profile.

2. The context information apparatus of claim 1, wherein the program is further configured to cause the processor to aggregate a plurality of context information of the user to obtain aggregated context information of the user, and cause the transmitter to transmit the aggregated context information.

3. The context information apparatus of claim 2, wherein the program is further configured to cause the processor to aggregate the plurality of context information of the user with a unique identifier of the user.

4. The context information apparatus of claim 3, wherein the unique identifier of the user comprises an International Mobile Subscriber Identity (IMSI) or a Globally Unique Temporary Identity (GUTI).

5. The context information apparatus of claim 2, wherein the program is further configured to cause the transmitter to transmit the aggregated context information periodically or when a predetermined amount of context information has been aggregated.

6. The context information apparatus of claim 1, wherein the program is further configured to cause the processor to update a counter that corresponds to an inactive behavior profile in response to determining, based on the evaluating, that the context information does not comply with the active behavior profile, wherein the active behavior profile describes the predicted behavior of a user, and the inactive behavior profile describes the behavior that the user is not supposed to have.

7. The context information apparatus of claim 1, wherein the context information comprises at least one of the following
 a network measurement,
 a network information,
 a mobility information,
 a service measurement information,
 a social information,
 a user contract information,
 a charging information,
 a charging data record,
 a user equipment information, and
 a timing information.

8. The context information apparatus of claim 7,
 wherein the network measurement or the network information comprises: a received signal strength, a Reference Signal Receiving Power (RSRP) value, a Reference Signal Receiving Quality (RSRQ) value, a backhaul link capacity, a backhaul link quality, a packet loss value, a transmission delay value, an interface information, an associated cell ID, a Mobile Country Code, or a Mobile Network Code (MNC), wherein the mobility information comprises user speed or a number of handovers,
 wherein the service measurement information comprises: an accessed service type, an accessed service duration, an accessed service characteristic, in particular at least one of a packet size, a packet transmission interval, a packet reception interval, an uplink bit rate, downlink bit rate, an acceptable jitter, an acceptable packet loss, or an acceptable packet error rate,
 wherein the social information comprises: an age, an employment, a profession, an education, an income, or a gender,
 wherein the user contract information comprises: a contract Id, a signature, or an expiration date,
 wherein the charging information the charging data record comprises a charging model or an available credit,
 wherein the user equipment information comprises at least one of:
  an available battery information,
  a maximum battery charging information,
  a device central processing unit description,
  a memory information,
  an operating system information,
  a screen size information,
  a screen resolution,
  a power information energy information that comprises a battery consumption rate, a battery level, or a current CPU level,
  an information about protocols supported by the user equipment comprising a type of protocol, a required memory, or a required CPU,
  an information about physical interfaces offered by a device comprising an uplink rate, a downlink rate, a round trip delay, a transmission error information, a packets sent information, or a packets received information.

9. The context information apparatus of claim 1, wherein the program is further configured to cause a receiver to receive the context information from a node in the communication network.

10. The context information apparatus of claim 1, wherein the program is further configured to cause the transmitter to transmit the context information and the consistency index to the content extraction engine through a second context information processor.

11. The context information apparatus of claim 1, further comprising a behavior profile storage configured to store a plurality of behavior profiles, wherein the program is further configured to cause the processor to update the active behavior profile when the context information does not comply with the active behavior profile.

12. A behavior profile distribution apparatus for a communication network, comprising:
 a receiver configured to receive, from one or more nodes, aggregated context information;

a processor configured to execute a program to update a behavior profile based on the aggregated context information; and a transmitter configured to transmit the updated behavior profile to one or more nodes in the communication network, wherein the aggregated context information comprises a consistency index which indicates a consistency of a behavior of an user with an active behavior profile, the consistency index is an updated consistency index, the consistency index is updated by increasing the consistency index, the consistency index being implemented as a counter capturing a number of times that the user is compliant to its predicted behavior.

13. A method for transmitting context information of a user in a communication network, the method comprising:
determining a context information of the user;
evaluating whether the context information of the user complies with an active behavior profile of the user;
updating a consistency index of a user in response to determining that the context information complies with the active behavior profile; wherein updating a consistency index comprises increasing the consistency index, the consistency index being implemented as a counter capturing a number of times that the user is compliant to its predicted behavior, and
transmitting the context information of the user and the consistency index to a content extraction engine, in response to determining, based on the evaluating, that the context information does not comply with the active behavior profile.

14. The method of claim 13, further comprising selecting the active behavior profile from a list of behavior profiles based on at least one of a time of the user a location of the user.

15. The method of claim 13, further comprising aggregating a plurality of context information of the user to obtain aggregated context information of the user; and transmitting the aggregated context information.

16. The method of claim 15, further comprising aggregating the plurality of context information of the user with a unique identifier of the user that comprises an International Mobile Subscriber Identity (IMSI) or a Globally Unique Temporary Identity (GUTI).

17. The method of claim 13, further comprising:
updating a counter that corresponds to an inactive behavior profile in response to determining, based on the evaluating, that the context information does not comply with the active behavior profile; wherein the active behavior profile describes the predicted behavior of a user, the inactive behavior profile describes the behavior that the user is not supposed to have.

18. The method of claim 13, further comprising:
storing a plurality of behavior profiles; and
updating the active behavior profile when the context information does not comply with the active behavior profile.

19. A non-transitory computer-readable storage medium storing program code, the program code comprising instructions which when executed by a processor, performs a process comprising:
determining a context information of a user;
evaluating whether the context information of the user complies with an active behavior profile of the user;
updating a consistency index of the user in response to determining that the context information complies with the active behavior profile; wherein updating a consistency index comprises increasing the consistency index, the consistency index being implemented as a counter capturing a number of times that the user is compliant to its predicted behavior, and
transmitting the context information and the consistency index to a content extraction engine, in response to determining, based on the evaluating, that the context information does not comply with the active behavior profile.

* * * * *